United States Patent [19]

Schnell

[11] 4,160,039

[45] Jul. 3, 1979

[54] METHOD FOR PREPARING SIMULATED DEEP FAT FRIED POTATOES

[75] Inventor: Philip G. Schnell, Wheaton, Ill.

[73] Assignee: Standard Oil Company (Indiana), Chicago, Ill.

[21] Appl. No.: 825,863

[22] Filed: Aug. 19, 1977

[51] Int. Cl.² .............................................. A23L 1/216
[52] U.S. Cl. ......................................... 426/60; 426/62; 426/302; 426/613; 426/637
[58] Field of Search .................. 426/60, 62, 602, 302, 426/613, 637, 656

[56] References Cited

U.S. PATENT DOCUMENTS

| | | | |
|---|---|---|---|
| 3,205,074 | 9/1965 | Nack et al. | 426/637 |
| 3,843,827 | 10/1974 | Lee et al. | 426/302 X |
| 3,920,852 | 11/1975 | Haas | 426/62 |
| 3,997,683 | 12/1976 | Schnell | 426/62 X |
| 4,000,319 | 12/1976 | Eichelburg | 426/62 X |
| 4,070,490 | 1/1978 | Lugay et al. | 426/602 X |

*Primary Examiner*—Jeanette M. Hunter
*Attorney, Agent, or Firm*—Gregory E. Croft; Arthur G. Gilkes; William T. McClain

[57] ABSTRACT

A simulated deep fat fried food is prepared by coating the food with an emulsified blend comprising inactive dried yeast, vegetable oil, and water, and baking the coated food in an oven.

11 Claims, No Drawings

METHOD FOR PREPARING SIMULATED DEEP FAT FRIED POTATOES

BACKGROUND OF THE INVENTION

1. Field of the Invention

This invention relates to methods for preparing baked foods. More particularly, it relates to baked foods which have the appearance and taste of deep fat fried foods and most specifically pertains to a method of preparing french fries.

2. Description of the Prior Art

Deep fat fried foods without batters or breaders such as french fries are popular food items in private homes and in restaurants. However, preparation of such products requires both a deep fat fryer and a large volume of oil, which is costly. Preparation of such deep fat fried foods also presents a hazard for skin burns and fires. Presently, commercial food processors supply substitutes such as frozen, blanched potatoes which can be baked in the oven. Unfortunately, these products do not have the texture and flavor of deep fat fried potatoes.

Accordingly, it is an object of this invention to provide a method of preparing baked foods which have the texture, flavor, and appearance of their deep fat fried counterparts.

It is a particular object of this invention to provide a method for preparing baked french fries having the texture and flavor of deep fat fried potatoes without the use of a deep fat fryer.

SUMMARY OF THE INVENTION

In one aspect, the invention resides in a method for preparing simulated deep fat fried foods comprising: forming a blend comprising from about 2 to about 10 weight percent inactive dried yeast, from about 50 to about 100 parts by weight vegetable oil, and from about 0 to about 50 parts by weight water; emulsifying the blend; coating the food with the emulsified blend; and baking the coated food at from abut 375° to about 450° F. for from about 5 to about 20 minutes. Regardless of the relative proportions of oil and water, the amount of inactive dried yeast should be from about 2 to about 10 weight percent of the final blend. The optimum baking time and temperatures will vary from one food item to the other and can be readily determined without undue experimentation. The emulsified blend preferably contains about 5 weight percent inactive dried yeast, about 75 parts by weight vegetable oil, and about 20 parts by weight water. The preferred yeast is *Candida utilis.*

More specifically, the invention resides in a method of making simulated french fried potatoes according to the above mentioned method. The raw french fries can be frozen or unfrozen and the coated fries can optionally be frozen prior to baking.

In another aspect, the invention resides in an emulsified coating for preparing simulated french fried foods comprising from about 2 to about 10 weight percent inactive dried yeast, from about 50 to about 100 parts by weight vegetable oil, and from about 0 to about 50 parts by weight water. The precise amounts of each component can vary several percent either way as desired for any specific application. The preferred yeast is *Candida utilis.* The preferred coating composition contains about 5 weight percent inactive dried yeast, about 75 weight percent vegetable oil, and about 20 weight percent water.

DESCRIPTION OF THE SPECIFIC EMBODIMENTS

EXAMPLE 1

A slurry of TORUTEIN-LF (a low flavor inactive dried *Candida utilis* yeast produced by Amoco Foods Company) and water was prepared containing 5 parts TORUTEIN-LF and 19 parts water by weight. To this slurry was added 76 parts vegetable oil with mixing and the mixture was emulsified in a colloid mill. Raw frozen french fries were dipped into the emulsion and frozen again. The frozen fries were baked at 450° F. for 20 minutes. The baked fries were crisp on the outside and tender inside and had a fried potato flavor due to the organoleptic characteristics of the yeast. In general, short cooking times at high temperatures gave better results than long baking times at low temperatures.

EXAMPLE 2

Several samples of french fried potatoes were prepared in several ways and baked in an oven on the same tray at 425° F. for 8 minutes on one side and 5 minutes on the other side. The various samples were prepared as follows:

Control A — Plain frozen comercial french fries straight from package (Brand A).
Control B — Plain frozen commercial french fries straight from package (Brand B).
Sample #1 — Brand A dusted with TORUTEIN (inactive dried *Candida utilis* yeast produced by Amoco Foods Company).
Sample #2 — Brand A frozen fries dipped in emulsion of vegetable oil and 3 weight percent TORUTEIN.
Sample #3 — Brand A frozen fries dipped in plain vegetable oil.
Sample #4 — Brand A frozen fries sprayed with a vegetable oil and dusted with TORUTEIN.
Sample #5 — Brand A frozen fries dipped in emulsion containing 1 weight percent TORUTEIN, 89 weight percent water, and 10 weight percent vegetable oil.
Sample #6 — Brand A frozen fries dipped in emulsion containing 5 weight percent TORUTEIN, 90 weight percent water, and 5 weight percent vegetable oil.
Sample #7 — Brand A frozen fries dipped in emulsion containing 10 weight percent TORUTEIN, 85 percent water, and 10 weight percent vegetable oil.

The results are summarized in TABLE I.

TABLE I

| Sample | Appearance | Texture | Taste |
|---|---|---|---|
| Control A | Golden brown | Slightly crisp | Bland |
| Control B | Golden brown | Limp | Bland |
| #1 | Poor - sandy | Dusty | — |
| #2 | Golden brown | Very crisp | Sharp potato flavor |
| #3 | Golden brown | Limp | Bland |
| #4 | Sandy | Limp | Yeasty |
| #5, #6, #7 | Very light color | Limp, soggy | Raw potato taste |

Sample #2 was clearly the best product of the test products. The emulsion coating gave the baked potatoes a fried appearance. The product had a glaze-like coating which rendered the product crisp on the outside and tender inside. The product tasted more like potatoes than the other samples.

EXAMPLE 3

Several different samples were prepared from frozen french fried potatoes. The samples were refrozen and then baked for 15 minutes at 450° F. The samles were as follows:

Sample #1 — Frozen french fries dipped in vegetable oil.

Sample #2 — Frozen french fries dipped in emulsion containing 80 ml. vegetable oil and 20 ml. water.

Sample #3 — Frozen french fries dipped in emulsion conatining 80 ml. vegetable oil, 20 ml. water, and 2g. TORUTEIN.

Sample #4 — Frozen french fries dipped in emulsion containing 80 ml. vegetable oil, 20 ml. water, and 5g. TORUTEIN.

Sample #5 — Frozen french fries dipped in emulsion containing 80 ml. vegetable oil, 20 ml. water, and 10g. TORUTEIN.

The results are summarized in TABLE II.

TABLE II

| Sample | Appearance | Texture | Flavor |
|---|---|---|---|
| #1 | Light brown | Greasy, soft, limp | — |
| #2 | Light brown | More crisp, mushy inside | — |
| #3 | Darker brown | Crisp | Different |
| #4 | Darker brown | Crisp | Good |
| #5 | Golden brown | Crisp | Off taste |

The results indicate that the sample containing about 5 percent TORUTEIN gave the best performance.

It will be apparent to those skilled in the art that many variations from these examples, shown for purposes of illustration and not limitation, can be made without departing from the scope of this invention.

I claim:

1. A method for preparing simulated french fried potatoes comprising:
   (a) forming a blend comprising from about 2 to about 10 weight percent inactive dried yeast, from about 50 to about 100 parts by weight vegetable oil, and from about 0 to about 50 parts by weight water;
   (b) emulsifying the blend;
   (c) coating the raw french fries with the emulsified blend; and
   (d) baking the coated french fries at from about 375 to about 450° F. for from about 5 to about 20 minutes.

2. The method of claim 1 wherein the inactive dried yeast is *Candida utilis*.

3. The method of claim 1 wherein the blend comprises about 5 weight percent inactive dried yeast, about 75 weight percent vegetable oil, and about 20 weight percent water.

4. The method of claim 1 wherein the french fries are baked at about 425° F. for about 13 minutes.

5. The method of claim 1 wherein the coated french fries are frozen prior to baking.

6. A method for preparing simulated french fried potatoes comprising:
   (a) forming a blend comprising about 5 weight percent inactive dried *Candida utilis* yeast, about 75 weight percent vegetable oil, and about 20 weight percent water;
   (b) emulsifying the blend;
   (c) coating raw french fries with the emulsion; and
   (d) baking the coated french fries at about 450° F. for about 20 minutes.

7. The method of claim 6 wherein the raw french fries are frozen.

8. The method of claim 7 wherein the coated french fries are refrozen prior to baking.

9. An emulsified coating composition for preparing simulated french fried foods consisting essentially of dried inactive yeast, vegetable oil, and water, said coating composition containing from about 2 to about 10 weight percent inactive dried yeast, from about 50 to about 100 parts by weight vegetable oil, and not more than about 50 parts by weight water.

10. The emulsified coating of claim 5 containing about 5 parts inactive dried yeast, about 75 parts vegetable oil, and about 20 parts water.

11. The coating of claim 10 wherein the inactive dried yeast is *Candida utilis*.

* * * * *

UNITED STATES PATENT OFFICE
CERTIFICATE OF CORRECTION

Patent No. 4,160,039            Dated July 3, 1979

Inventor(s) Philip G. Schnell

It is certified that error appears in the above-identified patent and that said Letters Patent are hereby corrected as shown below:

| Patent Column | Line | |
|---|---|---|
| 3 | 5 | "samles" should be --samples-- |
| 4 | 39 | "claim 5" should be --claim 9-- |

Signed and Sealed this

Fourth Day of December 1979

[SEAL]

Attest:

SIDNEY A. DIAMOND

Attesting Officer      Commissioner of Patents and Trademarks